Nov. 22, 1966 F. P. KEIPER, JR 3,287,628

VARIABLE PHASE SHIFTER HAVING GREATER THAN 180° RANGE UTILIZING FIXED REACTANCES AND POTENTIOMETER TO EFFECT PHASE SHIFT

Filed Nov. 22. 1963

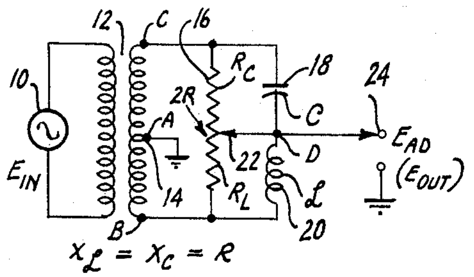

FIG. 1A. PRIOR ART 180° PHASE SHIFTER WITH BALANCED INPUT

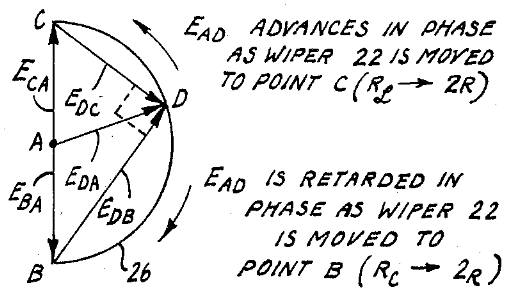

FIG. 1B. VOLTAGE VECTOR DIAGRAM, FIG. 1A. CIRCUIT

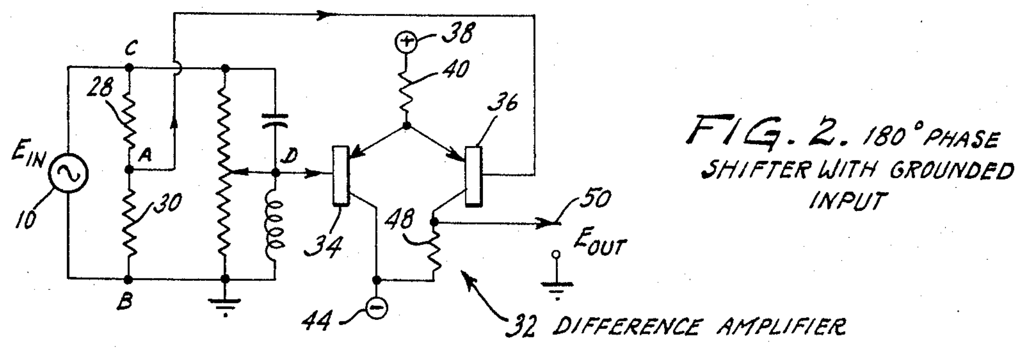

FIG. 2. 180° PHASE SHIFTER WITH GROUNDED INPUT

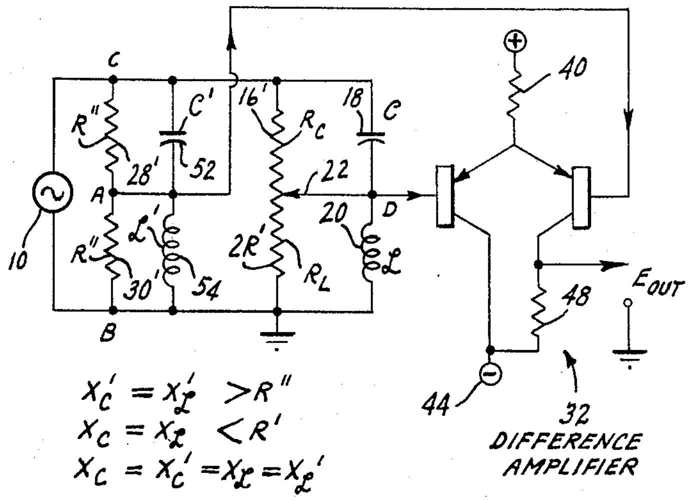

FIG. 3A. 210° PHASE SHIFTER

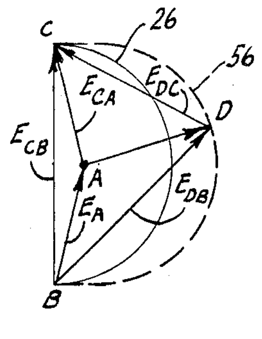

FIG. 3B. VOLTAGE VECTOR DIAGRAM FIG. 3A. CIRCUIT

INVENTOR.
FRANCIS P. KEIPER, JR.
BY D R Pressman
ATTORNEY

United States Patent Office 3,287,628

Patented Nov. 22, 1966

3,287,628

VARIABLE PHASE SHIFTER HAVING GREATER THAN 180° RANGE UTILIZING FIXED REACTANCES AND POTENTIOMETER TO EFFECT PHASE SHIFT

Francis P. Keiper, Jr., Oreland, Pa., assignor to Philco Corporation, Philadelphia, Pa., a corporation of Delaware Filed Nov. 22, 1963, Ser. No. 325,647

5 Claims. (Cl. 323—123)

This invention is a new and improved variable phase shifter, or electronic circuit for variably retarding or advancing within a given range the phase of an electrical signal.

Heretofore, variable phase shifters have been capable of continuously controlling the phase of an electrical signal within a range of about 180° while still maintaining a constant output voltage. However for phase shift ranges beyond 180°, range switches were necessitated to maintain output voltage linearity. These are obviously disadvantageous from standpoints of size, weight, cost, reliability, etc., but in addition they provide an undesirable inherent discontinuity in the operation of the phase shifter.

Therefore a linear phase shifter having a continuous range beyond 180° would be desirable.

*Objects.*—Accordingly, several objects of the present invention are:

(1) To provide a variable phase shifter having a continuous range greater than 180°.

(2) To provide a variable phase shifter of simplified construction which requires no range switches.

(3) To provide a variable phase shifter which provides a substantially constant output voltage throughout its entire range.

Other objects and advantages of the present invention will become apparent from a consideration of the ensuing description thereof.

*Summary.*—According to the present invention a signal to be shifted in phase is applied across four parallel branches: (1) first and second series-connected resistors, (2) a first inductor and first capacitor connected in series, the common junction of which is connected to the junction of said first and second resistors to form one output terminal, (3) a potentiometer, and (4) a second inductor and second capacitor connected in series, the common junction of which is connected to the wiper of said potentiometer to form the other output terminal of said phase shifter. Adjustment of the wiper of the potentiometer will create a variable phase shift throughout a range in excess of 180°.

In the drawing:

FIG. 1A shows a prior art 180° phase shifter supplied with a balanced input signal;

FIG. 1B is a voltage vector diagram of the circuit of FIG. 1A;

FIG. 2 shows a 180° phase shifter supplied with a grounded input signal source;

FIG. 3A shows a phase shifter according to the present invention; and

FIG. 3B is a voltage vector diagram of the circuit of FIG. 3A.

*FIGS. 1A and B.—Description*

The circuit of FIG. 1A is a prior art 180° phase shifter, an understanding of which will facilitate an understanding of the present invention.

The circuit of FIG. 1A includes a generator 10 which represents any source of alternating voltage of a given frequency whose phase is to be variably shifted. Generator 10 is connected across the primary winding of a phase splitting transformer 12. The secondary winding of transformer 12 is centertapped and grounded at point 14. The end terminals B and C of the secondary winding are connected to the end terminals of potentiometer 16, and also, respectively, to one end of a capacitor 18 and an inductor 20. The other ends of the capacitor and inductor are connected in common to the wiper 22 of potentiometer 16 and to output terminal 24. Adjustment of wiper 22 provides at terminal 24 a variably phase shifted version of the signal from generator 10.

Various points in the circuit of FIG. 1A are lettered to facilitate reference to the explanatory vector diagram of FIG. 1B. The grounded centertap is point A, the respective ends of the secondary winding are points B and C, and the commonly connected wiper and output terminal is point D. The vectors of FIG. 1B represent voltages occurring in the circuit of FIG. 1A. Thus, for example, vector A–C represents the relative phase of the voltage measured from point A to point C; vector A–D represents the voltage from point A to point D, i.e. the output voltage at point 24.

Capacitor 18 and inductor 20 are selected so that, at the frequency of source 10, the reactance $X_L$ of inductor 20 is equal to the reactance $X_C$ of capacitor 18. Thus a series-resonant circuit is provided across the secondary winding. The current therethrough will remain within safe limits despite the apparent theoretical zero impedance of the series-resonant circuit since an equivalent R–L–C series circuit exists for the parallel combination of potentiometer 16, capacitor 18, and inductor 20 as shown.

The ohmic impedance of the entire potentiometer 16, designated 2R, is arranged to be twice $X_L$ or $X_C$. The combined resistance of the top and bottom halves of potentiometer 16, $R_C$ plus $R_L$ will therefore always add to 2R ohms with either half variable from zero to 2R ohms by adjustment of wiper 22.

*Operation*

By adjustment of wiper 22 the phase of the voltage at terminal 24 may be shifted from 0 through 180 degrees. When the wiper is in its uppermost position at point C at which $R_L=2R$, the voltage from ground to point 24 will either be in phase with or 180° out of phase with the voltage of source 10, depending on the direction of the shift produced by transformer 12. When the wiper is in its lowermost position at point B at which $R_C=2R$, the phase of the voltage at point 24 will be 180° out of phase with its former position. As wiper 22 is moved between these end limits the phase of the voltage at point 24 will undergo a continuous shift within the 180° range. The magnitude of the output voltage will remain constant as its phase is shifted.

The vector diagram of FIG. 1B depicts the derivation of the output voltage, which is represented by vector D–A. Vector D–A is the sum of either (1) vectors B–A and D–B, or (2) vectors C–A and D–C. Vectors C–A and B–A will always be 180° out of phase since they represent the respective voltages at the end terminals of the secondary winding. It can be shown that vectors D–B and D–C will always be in quadrature when $X_C=X_L$ and the resistance of potentiometer 16 is 2R. D–B and D–C will therefore form two sides of right triangle B–C–D and the combined vectors B–A and C–A will form a fixed hypotenuse thereof. When wiper 22 is moved, for example toward point C, vector D–C will decrease and D–B will increase due to the voltage division of potentiometer 16. The locus of point D will be semicircle 26 as wiper 22 is moved, since the locus of the right angle intersection in a right triangle where the hypotenuse is held constant is a semicircle. Vector D–A, the output voltage, is the radius of the semicircle and hence will have constant amplitude with varying angle.

As wiper 22 is moved toward point C, the resistance $R_L$ approaches the value 2R, vector D–A will move counter clockwise, and the output voltage will advance in phase. When wiper 22 is moved in the opposite direction toward point B the phase of the output voltage will be retarded.

*FIG. 2.—Description*

An understanding of the circuit of FIG. 2 is also important to an understanding of the present invention. The circuit is similar to that of FIG. 1 with the following exceptions: (1) transformer 12 is eliminated, and (2) the output is applied across the inputs of a difference amplifier. Those elements in FIG. 2 having like counterparts in FIG. 1 have been identified with like reference numerals.

Source 10, one terminal of which is grounded, is connected across the series-connected resistors 28 and 30. The junction point of these resistors is not grounded but serves as one input of difference amplifier 32. The end terminals of resistors 28 and 30, points C and B, are connected as in FIG. 1.

Difference amplifier 32 is conventional. It includes two transistors 34 and 36, the common emitters of which are connected to positive bias source 38 via resistor 40. The collector of transistor 34 is connected directly to negative bias source 44, and the collector of transistor 36 is connected to source 44 via load resistor 48. The collector of transistor 36 is also connected to output terminal 50.

In lieu of using separate positive and negative power supplies 38 and 44, a single supply with end terminals connected in lieu of batteries 38 and 44 may be used. A resistor can be connected across this single supply with point B connected to a centertap thereof to provide a ground potential connection.

*Operation*

The phase shift operation of the circuit of FIG. 2 takes place in identical fashion to that of FIG. 1; the vector diagram of FIG. 1B is fully applicable. However, the reference potential points in FIG. 2 are different. Point B, rather than point A, is grounded and the voltage of point A in FIG. 2 is the same as the voltage of point B in FIG. 1, i.e., half that of source 10. Neither of the output terminals A or D of the phase shifter part of the circuit of FIG. 2 is therefore grounded. Terminals A and D are the input terminals for difference amplifier 32. The current flowing in resistor 48 will be proportional to the voltage difference between points A and D. The voltage at output terminal 50 will be proportional to the current in resistor 48 and can be referenced to ground since, when the voltage across points A–D is zero, transistor 36 will conduct and the current flowing through resistor 48 will provide zero volts at terminal 50.

The 180° phase shifting circuit of FIG. 2 is thus useful when an input signal referenced to ground is supplied and an output signal referenced to ground is required.

*FIGS. 3A and B.—Description*

The circuit of FIG. 3 is a phase shifter according to the invention which is capable of providing a voltage shift in excess of 180°, for example 210°. It is similar to the circuit of FIG. 2 with the following exceptions: The resistance of potentiometer 16 is increased so that R (one half the potentiometer resistance), now designated R′, is greater than $X_L$ or $X_C$. Resistors 28 and 30, now designated 28′ and 30′ or R″, are paralleled respectively by a second capacitor 52 (C′) and a second inductor 54 (L′). $X_L'$ is made equal to $X_C'$, and the resistance R″ of resistors 28′ and 30′ is made much less than $X_L'$ or $X_C'$.

*Operation*

Adjustment of wiper 22 in the circuit of FIG. 3 will shift the voltage measured from points A to D through a range in excess of 180°. Difference amplifier 32 restores voltage A–D to a ground reference level as before.

The circuit can best be understood by reference to the accompanying voltage vector diagram of FIG. 3B. The paralleling of resistors 28′ and 30′ by capacitor 52 and inductor 54, respectively, causes the phase of the voltage A–B to be shifted in relation to the applied voltage B–C. Voltages A–B and C–A add to equal the input voltage C–B. Since the impedance of $X_C'$ and $X_L'$ is far greater than R″, angle B–A–D is quite obtuse, e.g., approximately 150°. The phase of the potential at point A, which is one of the output terminals of the passive part of the phase shifter, is therefore different from zero degrees. Thus it is seen from the geometry of the vector diagram that by adjustment of wiper 22, the vector D–A can now be swept through a larger range as shown by the dashed line 56 rather than the former 180° range as indicated by line 26.

It has been found that making $X_L$ and $X_C$ less than R′ yields a substantially constant output voltage as its phase is shifted. It will be apparent that the phase shift control range may be doubled to 420° if the frequency of the output signal from the difference amplifier is doubled by a conventional frequency doubler.

The circuit of FIG. 3 was successfully operated with components having the following values:

| | |
|---|---|
| Resistors: | |
| **28′**, **30′**, ohms | 56 |
| **16′** (pot.), ohms | 500 |
| **40**, K ohms | 1.5 |
| **48**, K ohms | 2.7 |
| Inductors **54**, **20**, μh. | 100 |
| Capacitors **52**, **18**, pf. | 2700 |
| Source **10**, kc. | 300 |
| Battery **38**, v. | +12 |
| Battery **44**, v. | −12 |

The specificities above discussed including values of components are not to be considered as limiting the scope of the invention since many obvious modifications therefrom will occur to those skilled in the art. Accordingly the scope of the invention is to be determined only by the appended claims.

I claim:

1. A phase shifter for variably shifting the phase of a signal throughout a range in excess of 180° comprising: a source of an alternating current signal, one terminal of which is connected to a point at reference potential, said source being connected across the parallel combination of (1) two series-connected resistances, (2) a series-connected first capacitor and first inductor, (3) a potentiometer, and (4) a series-connected second capacitor and second inductor, the junctions of said two series connected resistances and said series-connected first capacitor and first inductor being joined and constituting a first terminal, said potentiometer including a wiper contact, said wiper contact of said potentiometer and the junction of said series-connected second capacitor and inductor being joined and constituting a second terminal, whereby adjustment of said wiper contact will shift the phase of a signal appearing across said terminals through a range in excess of 180°, and a difference amplifier having inputs connected across said first and second terminals, said difference amplifier being arranged to reference the signal appearing across said terminals to said point at reference potential.

2. The shifter of claim 1 wherein said two resistances are equal in value and less than the ohmic reactances of said first inductor and said capacitor at the frequency of said signal, said inductor and capacitor also having substantially equal reactances.

3. The shifter of claim 2 wherein the ohmic reactance of said second capacitor and inductor are substantially equal and less than one half the resistance of said potentiometer.

4. A phase shifter for variably shifting the phase of a signal through a range in excess of 180°, comprising:

(a) a source of alternating current signal of a particular frequency whose phase is to be variably shifted, as aforesaid, one terminal of said source being connected to a point at reference potential, (b) a circuit for shifting said signal to a reference phase whereby said greater than 180° shift can be effected, comprising a paralleled first inductor and resistor, one terminal of the paralleled combination being connected to one terminal of said source, and a paralleled first capacitor and resistor, one terminal of which is connected to the other terminal of said source and the other terminal of which is connected to the other terminal of said paralleled inductor and resistor, (c) a potentiometer connected across said source, (d) a second capacitor connected between one terminal of said source and the wiper of said potentiometer, (e) a second inductor connected between the other terminal of said source and said wiper, whereby adjustment of said wiper causes the phase of the signal appearing between said wiper and the junction of said paralleled inductor-resistor and said paralleled capacitor-resistor to be shifted through a range greater than 180°, and (f) a difference amplifier having two inputs and means for supplying said signal appearing between said wiper and said junction across said two inputs, said difference amplifier being arranged to reference said last-named signal to said point at reference potential.

5. The shifter of claim 4 wherein the ohmic reactance of said first inductor and capacitor at said frequency are each greater than the resistance of each of said resistors, and the ohmic impedance of said second inductor and capacitor at said frequency are each less than half the impedance of said potentiometer.

References Cited by the Examiner

UNITED STATES PATENTS

| | | | |
|---|---|---|---|
| 1,717,400 | 6/1929 | Nyquist | 323—123 |
| 2,483,090 | 9/1949 | Fuller | 323—109 X |
| 2,524,760 | 10/1950 | Brown | 323—123 X |

FOREIGN PATENTS

| | | |
|---|---|---|
| 653,212 | 11/1937 | Germany. |
| 524,095 | 7/1940 | Great Britain. |

JOHN F. COUCH, *Primary Examiner.*

A. D. PELLINEN, *Assistant Examiner.*